US012565869B2

(12) United States Patent
Matsuo et al.

(10) Patent No.: US 12,565,869 B2
(45) Date of Patent: Mar. 3, 2026

(54) ENGINE SYSTEM

(71) Applicant: Mazda Motor Corporation, Aki-gun (JP)

(72) Inventors: Takeru Matsuo, Aki-gun (JP); Hiroshi Minamoto, Aki-gun (JP); Masahiro Miyazaki, Aki-gun (JP); Yohei Nakano, Aki-gun (JP); Tomoyuki Wada, Aki-gun (JP); Sotaro Yoshida, Aki-gun (JP); Kentaro Takaki, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 0 days.

(21) Appl. No.: 19/049,241

(22) Filed: Feb. 10, 2025

(65) Prior Publication Data

US 2025/0264067 A1 Aug. 21, 2025

(30) Foreign Application Priority Data

Feb. 21, 2024 (JP) ................................ 2024-024453

(51) Int. Cl.
*F02M 26/15* (2016.01)
*F02D 41/00* (2006.01)
*F02M 26/06* (2016.01)
*F02M 26/05* (2016.01)

(52) U.S. Cl.
CPC .......... *F02M 26/15* (2016.02); *F02D 41/005* (2013.01); *F02M 26/06* (2016.02); *F02D 2200/0414* (2013.01); *F02D 2200/0802* (2013.01); *F02D 2250/26* (2013.01); *F02M 26/05* (2016.02)

(58) Field of Classification Search
CPC ........ F02M 26/05; F02M 26/06; F02M 26/15; F02D 2200/0802; F02D 2250/26
See application file for complete search history.

(56) References Cited

U.S. PATENT DOCUMENTS

| | | | | |
|---|---|---|---|---|
| 5,588,498 | A | 12/1996 | Kitada | |
| 2020/0332730 | A1 * | 10/2020 | Andersson ............ | B60W 20/15 |

FOREIGN PATENT DOCUMENTS

| | | | | | |
|---|---|---|---|---|---|
| DE | 102021113499 | A1 * | 12/2022 | ............... | F01N 9/00 |
| GB | 2566350 | A * | 3/2019 | ............. | F01N 9/002 |
| JP | 3000804 | B2 | 1/2000 | | |

* cited by examiner

*Primary Examiner* — Ngoc T Nguyen
(74) *Attorney, Agent, or Firm* — Alleman Hall LLP

(57) ABSTRACT

An engine system is provided with an adjustment apparatus, which adjusts an engine output parameter; and an exhaust gas recirculation (EGR) passage, which connects an exhaust passage on a downstream side relative to exhaust gas purification apparatuses with an intake passage, and returns EGR gas as a part of exhaust gas to the intake passage. Restriction control is carried out to control the adjustment apparatus such that when a purification apparatus temperature is lower than a predetermined reference temperature, an upper limit value of the engine output parameter is set to lower than a maximum value and the engine output parameter has a value equal to or lower than the upper limit value, such that when the outside air temperature is low, the upper limit value is set to a lower value than when the outside air temperature is high.

13 Claims, 7 Drawing Sheets

ENGINE SYSTEM

TECHNICAL FIELD

The present disclosure relates to an engine system.

BACKGROUND ART

In related art, as for engines or the like installed in vehicles, discussions have been held about reducing a discharge amount of harmful substances, in other words, improving exhaust performance. For example, JP3000804B2 discloses an engine including a catalyst apparatus, the engine reducing an intake air amount in order to reduce a discharge amount of a harmful substance when a temperature of a catalyst apparatus is low and an exhaust gas purification capability by the catalyst apparatus is low.

SUMMARY OF INVENTION

Problems to be Solved by the Invention

As described above, because combustion gas generated in an engine body and thus an amount of exhaust gas can be suppressed when an intake air amount is decreased, a discharge amount of a harmful substance can be decreased.

However, in an engine which has an exhaust gas recirculation (EGR) passage in which a part of exhaust gas is returned to an intake passage, it is difficult to obtain sufficient exhaust performance when an outside air temperature is low solely by carrying out control to decrease the intake air amount when a temperature of a catalyst apparatus is low. Specifically, when the outside air temperature is low, water in the exhaust gas may freeze in the EGR passage. When freezing occurs in the EGR passage, a return amount of the exhaust gas, which is returned to the intake passage through the EGR passage, becomes insufficient, and as a result, the exhaust performance is likely to be degraded. As noted above, the engine of above JP3000804B2 has a problem in which under a condition where the temperature of the catalyst apparatus is similarly low, the exhaust performance is more likely to be degraded when the outside air temperature is low than when the outside air temperature is high, and there is room for improvement in this area.

The present disclosure has been made in consideration of the above-described circumstance, and an object thereof is to provide an engine system that can achieve proper exhaust performance.

Means for Solving the Problems

For solving the above-described problems, the present disclosure includes: an engine body; an intake passage through which intake air entering the engine body flows; an exhaust passage through which exhaust gas exiting the engine body flows; an adjustment apparatus which adjusts an engine output parameter (such as engine torque or engine crankshaft rotation speed); an exhaust gas purification apparatus which is disposed in the exhaust passage and purifies exhaust gas; an EGR passage which connects the exhaust passage on a downstream side relative to the exhaust gas purification apparatus with the intake passage and returns EGR gas as part of exhaust gas to the intake passage; an EGR valve which opens and closes the EGR passage; an outside air temperature acquisition apparatus which acquires an outside air temperature; a purification apparatus temperature acquisition apparatus which acquires a purification apparatus temperature as a temperature of the exhaust gas purification apparatus; and a control apparatus which controls the adjustment apparatus and the EGR valve, and the present disclosure is such that the control apparatus carries out restriction control to control the adjustment apparatus such that an upper limit value of the engine output parameter (such as engine torque or engine crankshaft rotation speed) is set lower than a maximum value and the engine output or the engine torque has a value equal to or lower than the upper limit value in a case where the purification apparatus temperature is lower than a predetermined reference temperature, and sets the upper limit value to a lower value when the outside air temperature acquired by the outside air temperature acquisition apparatus is low than a value when the outside air temperature is high.

In the present disclosure, in a case where the temperature of the exhaust gas purification apparatus is lower than the predetermined reference temperature, the engine output or the engine torque is suppressed to the upper limit value, which is lower than the maximum value, or lower. This prevents a situation where a large amount of exhaust gas is generated in a state where a purification capability of the exhaust gas purification apparatus is low, and proper exhaust performance can be achieved.

Here, because a temperature of the exhaust gas flowing into the EGR passage is comparatively low in a configuration in which the EGR passage is connected to the downstream side relative to the exhaust gas purification apparatus, when the outside air temperature is low, water in the exhaust gas may freeze in the EGR passage. When freezing occurs in the EGR passage, a sufficient amount of exhaust gas (inactive gas) cannot be returned to the intake passage via the EGR passage, and degradation of exhaust performance, such as an increase in a discharge amount of $NO_x$ from the engine body, is likely to occur. As noted above, even under the same condition where the temperature of the exhaust gas purification apparatus is lower than the reference temperature, the exhaust performance is more likely to be degraded when the outside air temperature is lower. To deal with this, in the present disclosure, when the restriction control is carried out in which the engine output or the engine torque is set to have the upper limit value or lower, the above upper limit value is set to a lower value when the outside air temperature is low than a value when that is high. Thus, while excessive lowering of the engine output or the engine torque is avoided by setting the above upper limit value to a higher value when the outside air temperature is high, discharge amounts of the generated exhaust gas and harmful substances such as $NO_x$ within it can be suppressed to small amounts when the outside air temperature is low, and proper exhaust performance can be achieved.

In the above configuration, the control apparatus preferably prohibits opening of the EGR valve when the outside air temperature is lower than a predetermined reference temperature.

In this configuration, opening of the EGR valve is prohibited when the outside air temperature is lower than the reference temperature, and a flow of the exhaust gas in the EGR passage is stopped. Thus, water contained in the exhaust gas can be prevented from freezing in the EGR passage.

However, when the flow of the exhaust gas in the EGR passage and thus the return of the exhaust gas to the intake passage via the EGR passage are stopped, a discharge amount of $NO_x$ from the engine body may increase excessively. To deal with this, in the present disclosure, as described above, because the above upper limit value is set to be a low value when the outside air temperature is low such as when the outside air temperature is lower than the reference temperature, an amount of the exhaust gas can be suppressed to a small amount. Thus, an increase in a $NO_x$ discharge amount can be suppressed.

In the above configuration, the engine system preferably further includes a high-pressure EGR passage which connects the exhaust passage on an upstream side relative to the exhaust gas purification apparatus with the intake passage; and a high-pressure EGR valve which opens and closes the high-pressure EGR passage. The restriction control is carried out as follows: when the outside air temperature is lower than a predetermined reference temperature, the control apparatus sets the upper limit value to a lower value than when the outside air temperature is equal to or higher than the reference temperature, and permits opening of the high-pressure EGR valve but prohibits opening of the EGR valve; when the outside air temperature is equal to or higher than the reference temperature, the control apparatus permits opening of both the EGR valve and the high-pressure EGR valve.

In this configuration, opening of the EGR valve is prohibited when the outside air temperature is lower than the reference temperature, and water contained in the exhaust gas can thereby be prevented from freezing in the EGR passage. Further, in this configuration, in a circumstance where opening of the EGR valve is prohibited because the outside air temperature is lower than the reference temperature, the above upper limit value is set to a low value, and return of the exhaust gas to the intake passage via the high-pressure EGR passage is permitted. Thus, whereas the prohibition of opening of the EGR valve may likely cause an increase in the $NO_x$ discharge amount, the $NO_x$ discharge amount can be suppressed by reducing the discharge amount of the exhaust gas and by introducing the exhaust gas via the high-pressure EGR passage.

In the above configuration, the control apparatus preferably sets a target EGR amount as a target value of an amount of exhaust gas to be returned to the intake passage, sets an upper limit amount of high-pressure EGR gas to be returned to the intake passage via the high-pressure EGR passage, and controls the high-pressure EGR valve such that the amount of high-pressure EGR gas has a value equal to or lower than the upper limit value. The restriction control is carried out as follows: when the outside air temperature is lower than the reference temperature and the target EGR amount is equal to or smaller than the high-pressure EGR gas upper limit amount, the control apparatus sets the upper limit value to the same value as when the outside air temperature is equal to or higher than the reference temperature; when the outside air temperature is lower than the reference temperature and the target EGR amount is greater than the high-pressure EGR gas upper limit amount, it sets the upper limit value to a lower value than when the outside air temperature is equal to or higher than the reference temperature.

In this configuration, in a case where the target EGR amount is realizable by return of the exhaust gas to the intake passage via the high-pressure EGR passage even when the outside air temperature is lower than the reference temperature, the above upper limit value is set to the same comparatively high value as the value when the outside air temperature is equal to or higher than the reference temperature. Thus, while the discharge amount of $NO_x$ can be suppressed to a small amount by realization of the target EGR amount, the engine output or the engine torque can be secured. Meanwhile, in a case where the outside air temperature is lower than the reference temperature and the target EGR amount is not realizable, the above upper limit value is set to a low value, and the discharge amount of the exhaust gas is reduced. Thus, in this case also, the $NO_x$ discharge amount can be prevented from excessively increasing.

In the above configuration, the engine system preferably includes an exhaust gas temperature detection apparatus which detects a temperature of exhaust gas, so that as the temperature of the exhaust gas, which is detected by the exhaust gas temperature detection apparatus, becomes higher, the control apparatus sets a lower value for the high-pressure EGR gas upper limit amount.

In this configuration, a situation in which a large amount of the exhaust gas passes through the high-pressure EGR passage in a high-temperature state is prevented. Thus, heat damage from the exhaust gas to peripheral components of the high-pressure EGR passage can be suppressed. Further, when heat damage is less likely to affect the peripheral components because the temperature of the exhaust gas is low, a return amount of the exhaust gas to the intake passage is secured, and the discharge amount of $NO_x$ can thereby certainly be reduced.

In the above configuration, the control apparatus preferably sets the upper limit value such that the upper limit value becomes lower as the purification apparatus temperature becomes lower when the outside air temperature is lower than the reference temperature and the target EGR amount is greater than the high-pressure EGR gas upper limit amount, such that the upper limit value becomes lower as a deficiency in the high-pressure EGR gas upper limit amount with respect to the target EGR amount becomes greater.

In this configuration, when the outside air temperature is lower than the reference temperature, the upper limit value can be set to an appropriate value which corresponds to the outside air temperature and the purification apparatus temperature.

Advantageous Effects of Invention

As described above, an engine system of the present disclosure can enhance exhaust performance.

MODE FOR CARRYING OUT THE INVENTION

General Configuration of Engine

Figure 1:
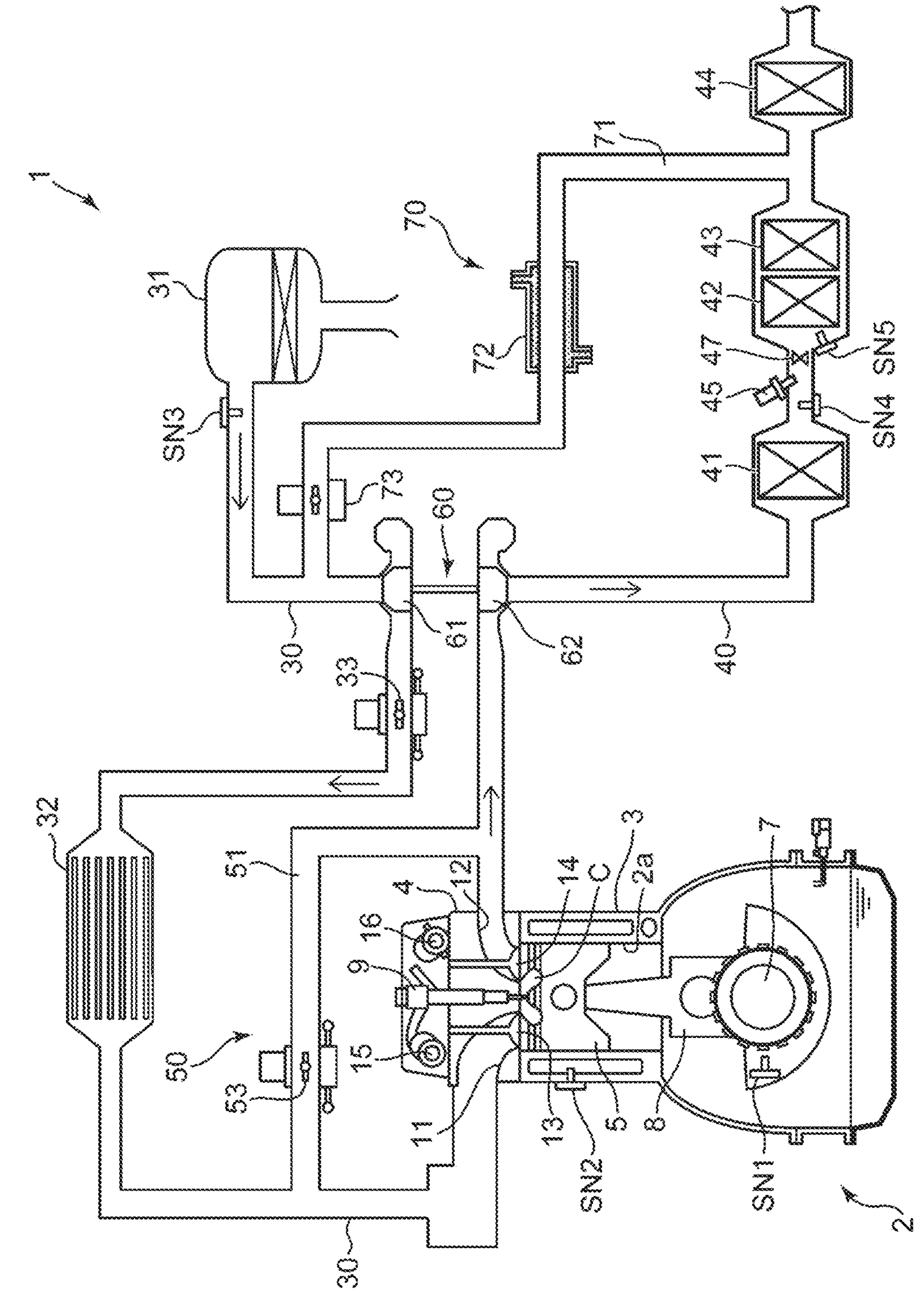
FIG. 1 is an outline configuration diagram illustrating a preferable embodiment of an engine system of the present disclosure.

FIG. 1 is an outline configuration diagram illustrating a preferable embodiment of an engine system of the present disclosure. An engine included in an engine system 1 illustrated in FIG. 1 is a four-cycle diesel engine which is installed in a vehicle as a motive power source for travel. The engine includes an engine body 2, an intake passage 30 through which intake air entering the engine body 2 flows, an exhaust passage 40 through which exhaust gas exhausted from the engine body 2 flows, an HP-EGR apparatus 50 and an LP-EGR apparatus 70 which return a part of the exhaust gas flowing through the exhaust passage 40 to the intake passage 30, and an exhaust turbocharging apparatus 60 which supercharges the intake air flowing through the intake passage 30.

The engine body 2 has a plurality of cylinders 2*a* which are aligned in a direction orthogonal to the page of FIG. 1 (only one cylinder is illustrated in FIG. 1). The engine body 2 includes a cylinder block 3, a cylinder head 4, and a plurality of pistons 5. Each of the cylinders 2*a* is formed with the cylinder block 3 and the cylinder head 4. That is, a plurality of cylindrical spaces which correspond to the plurality of cylinders 2*a* are formed in an internal portion of the cylinder block 3, and the cylinder head 4 is mounted on an upper surface of the cylinder block 3 so as to block the cylindrical spaces from an upper area. The piston 5 is housed in each of the cylinders 2*a* to be capable of reciprocatively sliding.

A combustion chamber C is formed above the piston 5 of each of the cylinders 2*a*. Each of the combustion chambers C is a space which is demarcated by a lower surface of the cylinder head 4, a side peripheral surface (cylinder liner) of the cylinder 2*a*, and a crown surface of the piston 5. The combustion chamber C receives a supply of fuel injected from an injector 9 which will be described later. The piston 5 receives combustion energy of the fuel supplied to the combustion chamber C and thereby performs reciprocating motion in an up-down direction.

A crankshaft 7 as an output shaft of the engine body 2 is provided below the piston 5 and in a lower portion of the cylinder block 3. The crankshaft 7 is coupled with the piston 5 of each of the cylinders 2*a* via a connecting rod 8 and rotates around a center axis in response to the reciprocating motion (up-down motion) of the piston 5.

A crank angle sensor SN1 and a water temperature sensor SN2 are mounted on the cylinder block 3. The crank angle sensor SN1 detects a crank angle as a rotation angle of the crankshaft 7 and an engine speed as a rotational speed of the crankshaft 7. The water temperature sensor SN2 detects a temperature of cooling water which flows through internal portions of the cylinder block 3 and the cylinder head 4 (in other words, an engine water temperature).

Fuel injectors 9 are mounted on the cylinder head 4. The fuel injector 9 supplies fuel to the combustion chamber C of each of the cylinders 2*a*. The fuel injector 9 is mounted on the cylinder head 4 such that a distal end portion of the fuel injector 9 is exposed in the combustion chamber C. A plurality of injection holes as outlets of fuel are formed in the distal end portion of the fuel injector 9. The fuel injected from each of the injection holes is combusted by self-ignition in the combustion chamber C which is at a high temperature and a high pressure due to a compression action of the piston 5. In the engine according to the present embodiment, engine torque is changed mainly in accordance with an amount of fuel injected by the fuel injectors 9. As noted above, in the present embodiment, the fuel injector 9 is one example of an "adjustment apparatus" of the present disclosure. Note that in the following description and in FIG. 2, which will be described later, the fuel injector 9 will simply be denoted as an injector 9. Other example components that can be used as the adjustment apparatus include a throttle valve, an intake valve operating mechanism, and/or an exhaust valve operating mechanism. It will be appreciated that each of these components can be used to adjust an engine output parameter, such as engine torque or engine crankshaft rotation speed. Further, the adjustment apparatus can include combinations of two or more of these components working together to adjust the engine output parameter.

In the cylinder head 4, intake ports 11 and exhaust ports 12 are formed. The intake port 11 is a port which connects the combustion chamber C of each of the cylinders 2*a* with the intake passage 30. The exhaust port 12 is a port which connects the combustion chamber C of each of the cylinders 2*a* with the exhaust passage 40. An intake valve 13 is provided in the intake port 11 of each of the cylinders 2*a*, and an exhaust valve 14 is provided in the exhaust port 12 of each of the cylinders 2*a*.

The cylinder head 4 is equipped with an intake valve operating mechanism 15 and an exhaust valve operating mechanism 16. The intake valve operating mechanism 15 drives the intake valve 13 of each of the cylinders 2*a* to open and close in conjunction with rotations of the crankshaft 7. The exhaust valve operating mechanism 16 drives the exhaust valve 14 of each of the cylinders 2*a* to open and close in conjunction with rotations of the crankshaft 7. The intake valve 13 periodically opens and closes an opening of the intake port 11 on the combustion chamber C side in response to driving of the intake valve operating mechanism 15. The exhaust valve 14 periodically opens and closes an opening of the exhaust port 12 on the combustion chamber C side in response to driving of the exhaust valve operating mechanism 16.

The intake passage 30 is a passage for introducing intake air into the combustion chamber C of each of the cylinders 2*a*. The intake passage 30 has a surge tank in a portion, on a downstream side, which is close to the engine body 2. The surge tank is a tank which provides an expansion space for equalizing an amount of intake air into each of the cylinders 2*a*. In a portion of the intake passage 30 on an upstream side relative to the surge tank, an air cleaner 31, a throttle valve 33, and an intercooler 32 are sequentially provided. The air cleaner 31 is a filter for removing foreign substances in the intake air. The intercooler 32 is a heat exchanger which cools the intake air compressed by the exhaust turbocharging apparatus 60. The throttle valve 33 is a valve which adjusts intake airflow. An air flow sensor SN3 is mounted on the intake passage 30. The air flow sensor SN3 is a sensor which detects the flow amount of the intake air, which enters the engine body 2, and is arranged in a portion of the intake passage 30 on the downstream side relative to the air cleaner 31.

The exhaust passage 40 is a passage for discharging the exhaust gas from the combustion chamber C of each of the cylinders 2*a* out of the engine system. The exhaust passage 40 is provided with a plurality of catalysts 41 to 44 for purifying various harmful components contained in the exhaust gas. Specifically, an oxidation catalyst apparatus 41, a Selective Catalytic Reduction Filter (SCRF) 42, an SCR catalyst apparatus 43, and a slip catalyst apparatus 44 are provided in this order from the upstream side (the side close to the engine body 2) of the exhaust passage 40. Further, a urea injector 45 and a mixing plate 47 are provided in a portion between the oxidation catalyst apparatus 41 and the SCRF 42 in the exhaust passage 40.

The oxidation catalyst apparatus 41 has a catalyst for oxidizing and detoxifying CO and HC in the exhaust gas (for converting into $CO_2$ and $H_2O$). The oxidation catalyst apparatus 41 has a porous carrier and a catalyst substance such as platinum or palladium, which is carried by the carrier, for example.

The urea injector 45 is an injection valve which injects urea water made by dissolving high-purity urea into pure water. The urea injector 45 injects the urea water, which is supplied from a urea water tank (not illustrated) installed in the vehicle, into an internal portion of the exhaust passage 40. Urea in the injected urea water is converted into ammonia ($NH_3$) by hydrolysis at a high temperature and is adsorbed on SCR catalysts included in the SCRF 42 and the SCR catalyst apparatus 43 on the downstream side.

The mixing plate 47 is a plate-shaped member for stirring the exhaust gas flow. The mixing plate 47 serves to uniformly disperse the urea in the urea water injected from the urea injector 45 and to send it downstream (to the SCRF 42 and the SCR catalyst apparatus 43).

The SCRF 42 is a filter with an SCR catalyst. The SCRF 42 is an apparatus in which a catalyst substance such as platinum for combusting soot and the SCR catalyst are carried by a filter capable of collecting the soot in the exhaust gas. As described above, the SCRF 42 adsorbs ammonia which is generated from the urea water injected by the urea injector 45. The SCR catalyst included in the SCRF 42 is a selective reduction type $NO_x$ catalyst and reduces and detoxifies $NO_x$ in the exhaust gas (converts that into $N_2$ and $H_2O$) by a chemical reaction using ammonia as a reducing agent. As the SCR catalyst, for example, vanadium, tungsten, zeolite or the like is used.

The SCR catalyst apparatus 43 is an apparatus including the SCR catalyst and has a porous carrier and the SCR catalyst such as vanadium, tungsten, or zeolite which is carried by the carrier, for example. The SCR catalyst apparatus 43 reduces $NO_x$ which is not reduced by the SCRF 42. A casing is shared by the SCRF 42 and the SCR catalyst apparatus 43, and the SCR catalyst apparatus 43 is provided on an immediate downstream position of the SCRF 42. The above SCRF 42 and SCR catalyst apparatus 43 correspond to "exhaust gas purification apparatuses" of the present disclosure.

The slip catalyst apparatus 44 is an apparatus which has an oxidation catalyst for oxidizing ammonia slipping from the SCRF 42 and the SCR catalyst apparatus 43 (in other words, the ammonia flowing out to the downstream side without being used for reduction of $NO_x$). As the slip catalyst apparatus 44, for example, an apparatus having a similar structure to the oxidation catalyst apparatus 41 can be used.

In a portion between the oxidation catalyst apparatus 41 and the urea injector 45 in the exhaust passage 40, a $NO_x$ sensor SN4 is provided which detects a concentration of $NO_x$ in the exhaust gas. Further, in an immediate upstream portion of the SCRF 42 (a portion between the mixing plate 47 and the SCRF 42), an exhaust gas temperature sensor SN5 is provided which detects a temperature of the exhaust gas. The exhaust gas temperature sensor SN5 is one example of an "exhaust gas temperature detection apparatus" of the present disclosure.

The exhaust turbocharging apparatus 60 is a supercharging apparatus which uses the exhaust gas exhausted from the combustion chamber C and thereby supercharges air to be supplied to the above combustion chamber C. The exhaust turbocharging apparatus 60 includes a compressor 61 which is arranged in the intake passage 30 and a turbine 62 which is coaxially coupled with the compressor 61 and is arranged in the exhaust passage 40. The compressor 61 is arranged in a portion between the air cleaner 31 and the intercooler 32 in the intake passage 30. The turbine 62 is arranged in a portion of the exhaust passage 40 on the upstream side relative to the oxidation catalyst apparatus 41.

The exhaust gas exhausted from the engine body 2 enters the turbine 62, and the turbine 62 is driven to rotate by the exhaust gas. The compressor 61 rotates in conjunction with the turbine 62 and pressure-feeds the intake air to the downstream side. In other words, the exhaust turbocharging apparatus 60 supercharges to send the intake air in the intake passage 30 to the engine body 2 while compressing the intake air.

The HP-EGR apparatus 50 includes an HP-EGR passage 51 and an HP-EGR valve 53. The HP-EGR passage 51 is a passage for returning the exhaust gas from the exhaust passage 40 to the intake passage 30. The HP-EGR passage 51 connects a portion of the exhaust passage 40 on the upstream side relative to the turbine 62 with a portion between the throttle valve 33 and the compressor 61 in the intake passage 30. The HP-EGR valve 53 is a valve which adjusts a return amount of HP-EGR gas as the exhaust gas which is returned to the intake passage 30 through the HP-EGR passage 51.

The LP-EGR apparatus 70 includes an LP-EGR passage 71, an EGR cooler 72, and an LP-EGR valve 73. The LP-EGR passage 71 is a passage for returning the exhaust gas, which passes through the SCR catalyst apparatus 43, to the intake passage 30. The LP-EGR passage 71 connects a portion between the SCR catalyst apparatus 43 and the slip catalyst apparatus 44 in the exhaust passage 40 with a portion of the intake passage 30 on the upstream side relative to the compressor 61. The EGR cooler 72 cools LP-EGR gas as the exhaust gas which is returned to the intake passage 30 through the LP-EGR passage 71. The LP-EGR valve 73 is a valve which adjusts a return amount of LP-EGR gas. In the following, the exhaust gas which is returned to the intake passage 30 by the HP-EGR apparatus 50 and the LP-EGR apparatus 70 will be referred to as EGR gas. In other words, the HP-EGR gas and the LP-EGR gas will collectively be referred to as EGR gas. Further, returning the exhaust gas by using the LP-EGR apparatus 70 will appropriately be referred to as LP-EGR, and returning the exhaust gas by using the HP-EGR apparatus 50 will appropriately be referred to as HP-EGR. Note that the LP-EGR passage 71 is one example of an "EGR passage" of the present disclosure, and the LP-EGR valve 73 is one example of an "EGR valve" of the present disclosure. Further, the HP-EGR passage 51 is one example of a "high-pressure EGR passage" of the present disclosure, and the HP-EGR valve 53 is one example of a "high-pressure EGR valve" of the present disclosure. Further, HP-EGR gas is one example of a "high-pressure EGR gas" of the present disclosure.

Control System

Figure 2:
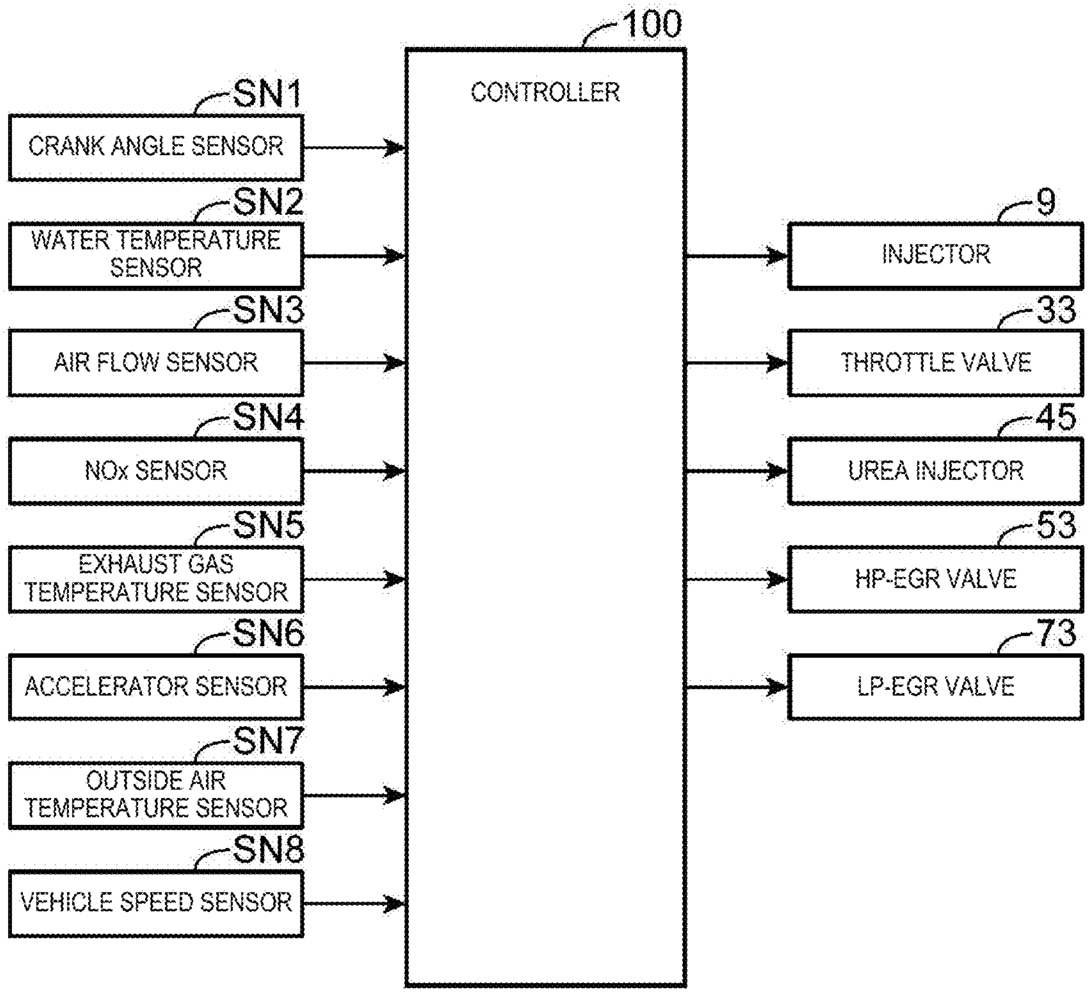
FIG. 2 is a function block diagram illustrating a control system of an engine.

FIG. 2 is a function block diagram illustrating a control system of the engine of the present embodiment. The engine system 1 has a controller 100. The controller 100 is an apparatus for integrally controlling the engine and is configured with a microcomputer including a Central Processing Unit (CPU), Read-Only Memory (ROM), Random-Access Memory (RAM), and so forth. The controller 100 is one example of a "control apparatus" of the present disclosure.

Detection information by various sensors is input to the controller 100. Specifically, the controller 100 is electrically connected to the above-described crank angle sensor SN1, water temperature sensor SN2, air flow sensor SN3, $NO_x$ sensor SN4, and exhaust gas temperature sensor SN5, and various information detected by those sensors, for example, information such as the crank angle, the engine speed, the engine water temperature, an intake air flow amount, and the temperature of the exhaust gas is each and successively input to the controller 100.

Further, the vehicle is provided with an accelerator sensor SN6 which detects an opening (hereinafter referred to as an accelerator opening) of an accelerator pedal which is operated by a driver driving the vehicle, an outside air temperature sensor SN7 which detects an outside air temperature, and a vehicle speed sensor SN8 which detects a vehicle speed, and detection information by those accelerator sensor SN6, outside air temperature sensor SN7, and vehicle speed sensor SN8 is successively input to the controller 100. The outside air temperature sensor SN7 is an apparatus which acquires the outside air temperature by detection and is one example of an "outside air acquisition apparatus" of the present disclosure.

The controller 100 controls each unit of the engine while executing various kinds of determinations, computation, and so forth based on input information from each of the above sensors (SN1 to SN8). That is, the controller 100 is electrically connected to the injectors 9, the throttle valve 33, the urea injector 45, the HP-EGR valve 53, the LP-EGR valve 73, and so forth and respectively outputs signals for control to those devices based on results or the like of the above computation.

Figure 3:
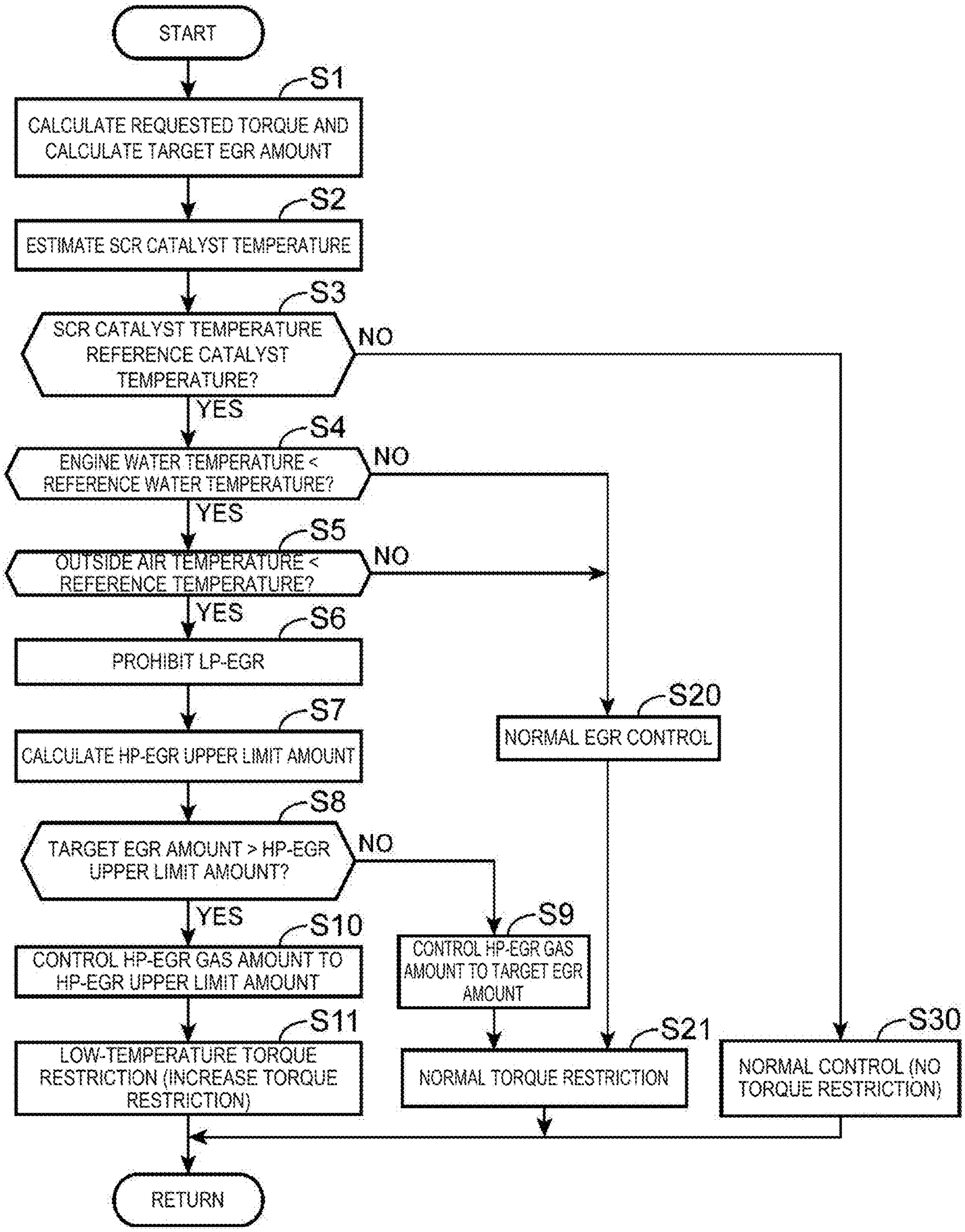
FIG. 3 is a flowchart illustrating procedures of control to be carried out by a controller.

Control to be carried out by the controller 100 will be described by using a flowchart in FIG. 3. Note that the flowchart illustrated in FIG. 3 is repeatedly carried out every predetermined computation cycle while the engine is driven.

First, the controller 100 calculates an engine load, in other words, requested torque as engine torque which is requested by the driver of the vehicle (step S1). The controller 100 calculates the requested torque based on the vehicle speed detected by the vehicle speed sensor SN8, the accelerator opening detected by the accelerator sensor SN6, and so forth. The requested torque is set to have a value equal to or lower than a maximum value of the engine torque that is a maximum value of torque realizable by the engine body. Note that the maximum value of the engine torque is set in advance based on a maximum combustion pressure, an air amount, and so forth.

Further, the controller 100 calculates a target value of an amount of the EGR gas to enter the cylinder 2*a*, in other words, a target EGR amount as a target value of an amount of exhaust gas to be returned to the intake passage 30 (step S1). The controller 100 sets the target EGR amount based on the requested torque, which is calculated in step S2, and so forth. In the present embodiment, as the requested torque becomes higher, the target EGR amount is set to have a higher value.

Next, the controller 100 estimates an SCR catalyst temperature as a temperature of the SCRF 42 (step S2). The SCR catalyst temperature is one example of a "purification apparatus temperature" of the present disclosure.

In step S2, the controller 100 estimates an input heat quantity to the SCRF 42 and a dissipated heat quantity from the SCRF 42 and estimates the SCR catalyst temperature based on those quantities. Specifically, the controller 100 estimates a flow amount of the exhaust gas based on the intake air flow amount, which is detected by the air flow sensor SN3 or the like, and calculates the input heat quantity to the SCRF 42 based on the flow amount of the exhaust gas and the temperature of the exhaust gas immediately in front of the SCRF 42, which is detected by the exhaust gas temperature sensor SN5. Further, the controller 100 calculates the dissipated heat quantity from the SCRF 42 based on the vehicle speed detected by the vehicle speed sensor SN8 and the outside air temperature detected by the outside air temperature sensor SN7. The controller 100 calculates the SCR catalyst temperature based on the calculated input heat quantity and dissipated heat quantity of the SCRF 42 and a heat capacity of the SCRF 42 which is stored in advance. The SCR catalyst temperature is calculated to be a higher value as the input heat quantity becomes larger or the dissipated heat quantity becomes smaller and is calculated to be a lower value as the input heat quantity becomes smaller or the dissipated heat quantity becomes larger. Here, the dissipated heat quantity from the SCRF 42 can be treated as a larger quantity as the vehicle speed becomes higher. This is because as the vehicle speed becomes higher, traveling air blowing against the SCRF 42 increases and causes more heat dissipation. Conversely, because the dissipated heat quantity becomes smaller as the vehicle speed becomes lower, the SCR catalyst temperature is estimated as higher as the vehicle speed becomes lower. As noted above, in the present embodiment, the SCR catalyst temperature is estimated by the controller 100, and the controller 100 is one example of a "purification apparatus temperature acquisition apparatus" of the present disclosure.

After step S2, the controller 100 determines whether or not the estimated SCR catalyst temperature is lower than a reference catalyst temperature (step S3). The reference catalyst temperature is the temperature of the SCR catalyst in a case where a $NO_x$ purification rate by the SCR catalyst has a value equal to or higher than a predetermined value, in other words, the temperature of the SCRF 42. The reference catalyst temperature is set in advance and stored in the controller 100. The reference catalyst temperature is one example of a "reference temperature" of the present disclosure.

When the determination in step S3 is NO and the SCR catalyst temperature is equal to or higher than the reference catalyst temperature, the controller 100 carries out normal control (step S30) and finishes a process (returns to step S1).

When the normal control is carried out, the controller 100 determines a fuel injection amount as an amount of fuel to be injected from the injectors 9 based on the requested torque, which is calculated in step S2, and the intake air flow amount, which is detected by the air flow sensor SN3, and controls the injectors 9 accordingly. As described later, in a case where the determination in step S3 is YES, torque restriction is carried out in which the fuel injection amount is controlled such that the engine torque does not exceed an upper limit torque which is lower than the maximum value of the engine torque. On the other hand, when the normal control is carried out, the torque restriction is not performed, the requested torque is realized, and the fuel injection amount is controlled such that the engine torque does not exceed its maximum value.

Figure 4:
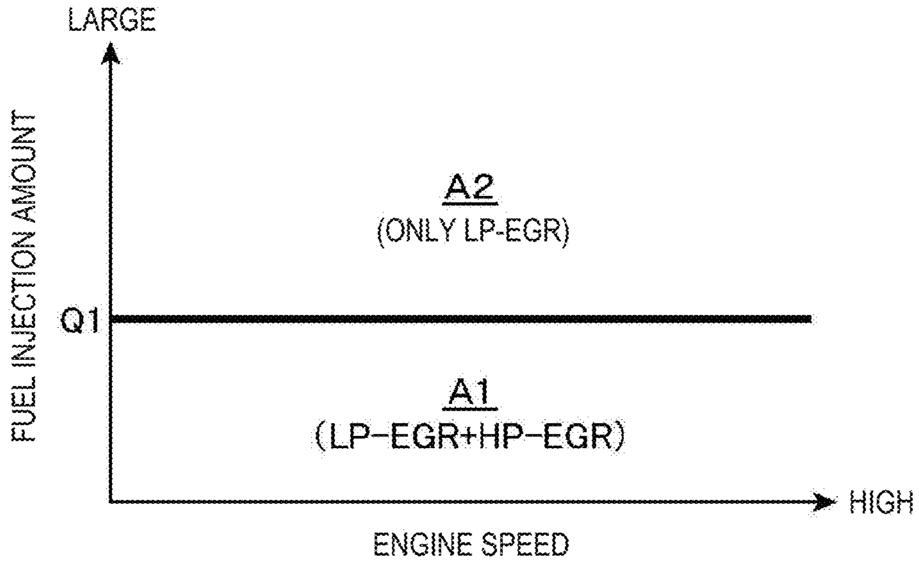
FIG. 4 is a map illustrating a control region of an EGR apparatus included in the engine.

Further, when the normal control is carried out, the controller 100 controls an opening of each of the throttle valve 33, the HP-EGR valve 53, and the LP-EGR valve 73 such that the target EGR amount calculated in step S3 is realized. FIG. 4 is a map which illustrates control regions of the HP-EGR apparatus 50 and the LP-EGR apparatus 70 in a case where the normal control is carried out. As illustrated in FIG. 4, as for control of the EGR apparatuses, an operation region of the engine is demarcated into a low load region A1 in which the fuel injection amount is equal to or smaller than a predetermined switching injection amount Q1 and a high load region A2 in which the fuel injection amount is larger than the switching injection amount Q1. In the low load region A1, the exhaust gas is returned by both of the HP-EGR apparatus 50 and the LP-EGR apparatus 70. In other words, when the normal control is carried out, the controller 100 determines in which of the low load region A1 and the high load region A2 the engine is operating and opens both of the HP-EGR valve 53 and the LP-EGR valve 73 in a case where the engine is operating in the low load region A1. On the other hand, in a case where the engine is operating in the high load region A2, the controller 100 closes the HP-EGR valve 53 and opens only the LP-EGR valve 73. Note that the controller 100 performs the above determination based on the fuel injection amount which is determined based on the requested torque.

Figure 5:
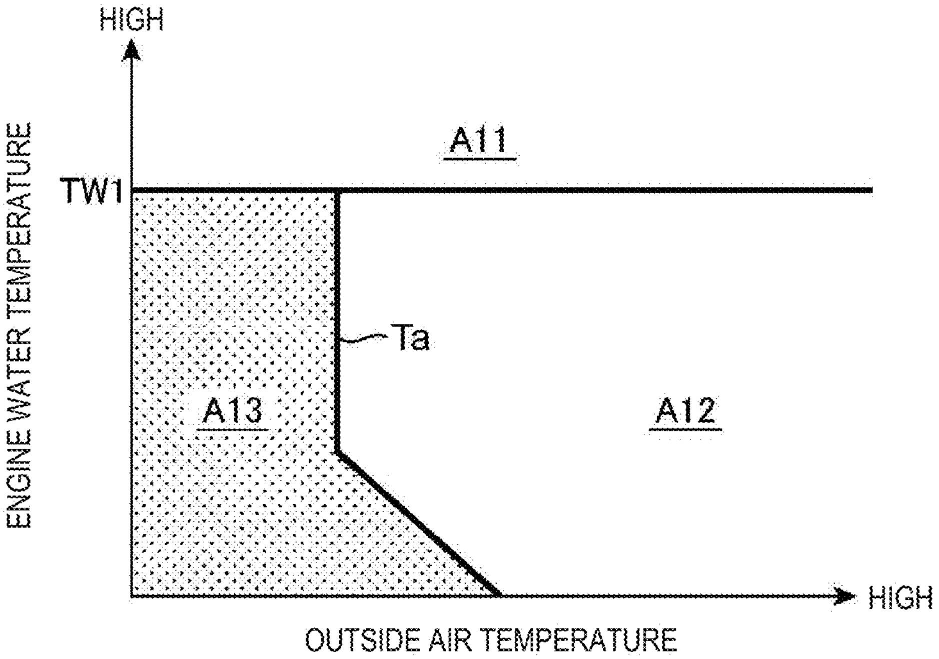
FIG. 5 is a map for explaining a prohibition region of LP-EGR.
Figure 6:
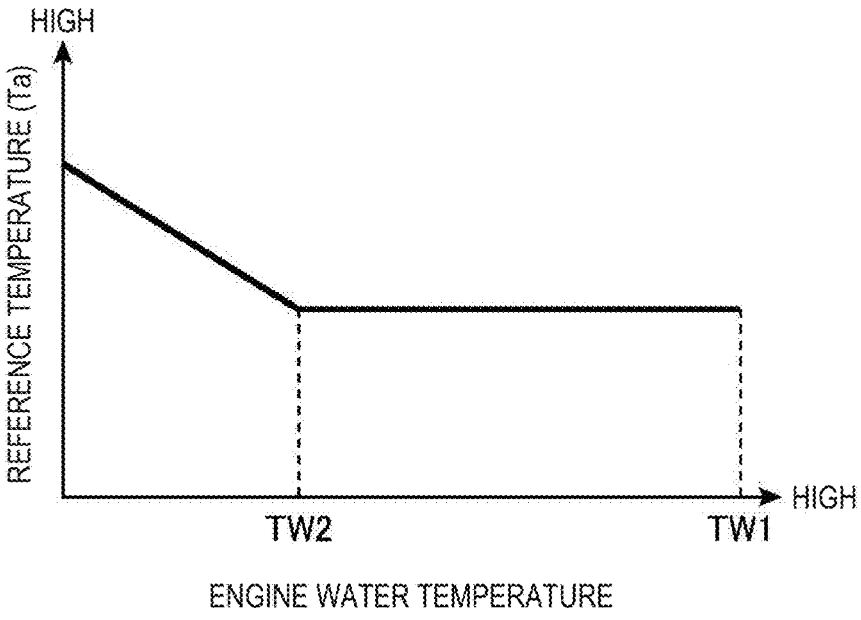
FIG. 6 is a graph illustrating a relationship between an engine water temperature and a reference temperature.

Returning to step S3, in a case where the determination in step S3 is YES and it is determined that the SCR catalyst temperature is lower than the reference catalyst temperature, the controller 100 determines whether or not a condition for prohibiting the LP-EGR is met. FIG. 5 is a map in which the horizontal axis represents the outside air temperature and the vertical axis represents the engine water temperature. In the map in FIG. 5, a region in which the engine water temperature is equal to or higher than a predetermined reference water temperature TW1 is set as a first region A11, a region in which the engine water temperature is lower than the reference water temperature TW1 and the outside air temperature is equal to or higher than a predetermined reference temperature Ta is set as a second region A12, and a region in which the engine water temperature is lower than the reference water temperature TW1 and the outside air temperature is lower than the reference temperature Ta is set as a third region A13. In the present embodiment, the LP-EGR is prohibited when each of the engine water temperature and the outside air temperature is in the third region A13. The reference water temperature TW1 is set in advance and stored in the controller 100. The reference water temperature TW1 is set to a temperature approximately the same as the engine water temperature at a time when a warming-up operation of the engine is finished. The reference temperature Ta is set in advance and stored in the controller 100. FIG. 6 is a graph illustrating a relationship between the engine water temperature and the reference temperature Ta. As illustrated in FIG. 5 and FIG. 6, the reference temperature Ta is set such that its value becomes lower as the engine water temperature becomes higher. Details of the reference temperature will be described later.

In a case where the determination in step S3 is YES, the controller 100 first determines whether or not the engine water temperature detected by the water temperature sensor SN2 is lower than the reference water temperature TW1, in other words, whether or not the above engine water temperature is in the first region A11 (step S4).

In a case where the determination in step S4 is NO and the engine water temperature is equal to or higher than the reference water temperature TW1, the controller 100 does not prohibit the LP-EGR and carries out normal EGR control. In other words, the controller 100 performs similar control to that of the normal control for the HP-EGR apparatus 50 and the LP-EGR apparatus 70 (step S20). Specifically, as described above, the controller 100 determines which of the HP-EGR apparatus 50 and the LP-EGR apparatus 70 is used in accordance with the operation region (the low load region A1 or the high load region A2) of the engine and controls the opening of each of the throttle valve 33, the HP-EGR valve 53, and the LP-EGR valve 73 such that the target EGR amount calculated in step S3 is realized.

Further, in a case where the determination in step S4 is NO, the controller 100 carries out normal torque restriction (step S21).

Figure 7:
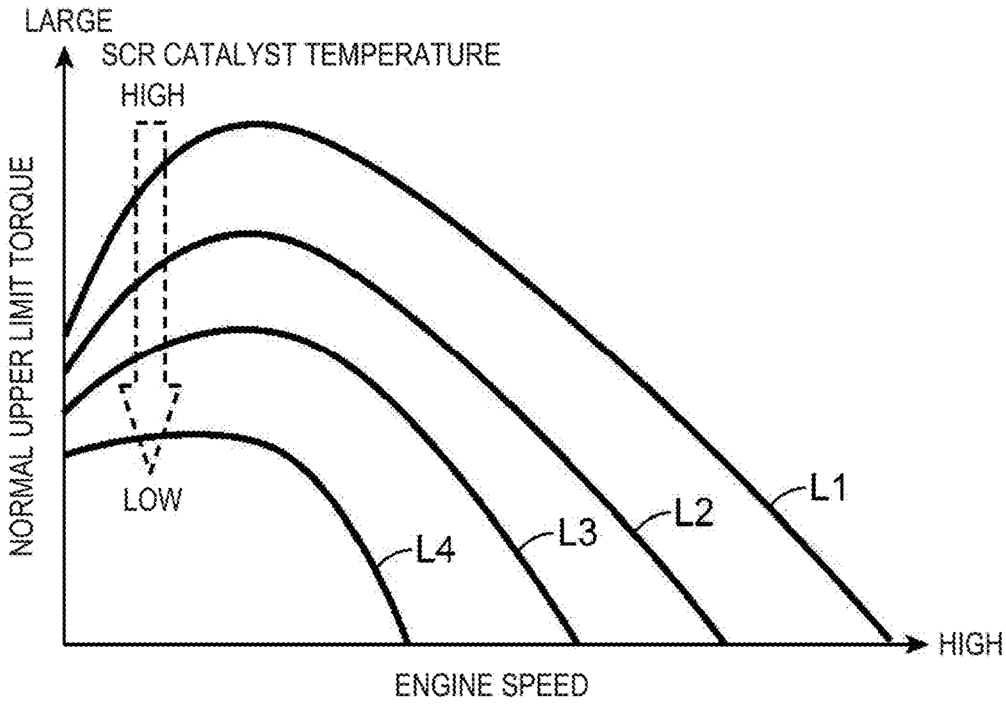
FIG. 7 is a graph illustrating a relationship among an engine speed, a Selective Catalytic Reduction (SCR) catalyst temperature, and normal upper limit torque.

When the normal torque restriction is carried out, the controller 100 first sets a normal upper limit torque as an upper limit value of the engine torque, lower than the maximum value of the engine torque. The controller 100 sets the normal upper limit torque based on the engine speed and the SCR catalyst temperature. FIG. 7 is a graph schematically illustrating a relationship among each of the engine speed, the SCR catalyst temperature, and the normal upper limit torque. Each of lines L1 to L4 in the graph in FIG. 7 is a line which represents a relationship between the engine speed and the normal upper limit torque for each of the SCR catalyst temperatures. The SCR catalyst temperatures which correspond to four lines L1, L2, L3, and L4 are higher in this order, and the normal upper limit torque is set to have a higher value as the SCR catalyst temperature becomes higher. Further, as it can be understood from each of the lines L1 to L4, under a condition where the SCR catalyst temperature is fixed, the normal upper limit torque is set to have a higher value as the engine speed becomes higher, when the engine speed is lower than a predetermined revolution speed and is set to have a lower value as the engine speed becomes higher, in turn when the engine speed is equal to or higher than the above predetermined revolution speed. In the controller 100, the relationship among the engine speed, the SCR catalyst temperature, and the normal upper limit torque is stored as a map. The controller 100 extracts, from the map, a value which corresponds to the engine speed detected by the crank angle sensor SN1 and to the SCR catalyst temperature estimated in step S2 and sets the extracted value as the normal upper limit torque. Note that as described above, the normal upper limit torque stored in the map is set to have a value lower than the maximum value of the engine torque.

When the normal torque restriction is carried out, after the normal upper limit torque is set, the controller 100 compares the requested torque, which is calculated in step S1, with the normal upper limit torque. Then, in a case where the requested torque is equal to or smaller than the normal upper limit torque, the controller 100 determines the fuel injection amount based on the requested torque and controls the injectors 9 accordingly. On the other hand, in a case where the requested torque is larger than the normal upper limit torque, the controller 100 determines the fuel injection amount based not on the requested torque but on the normal upper limit torque which is lower than that, and controls the injectors 9 accordingly.

As noted above, in a case where the SCR catalyst temperature is lower than the reference catalyst temperature (the determination in step S3 is YES) and the engine water temperature is equal to or higher than the reference water temperature TW1 (the determination in step S4 is NO), the normal torque restriction is carried out, and the engine torque is suppressed to the normal upper limit torque or smaller. After the normal torque restriction is carried out, the controller 100 finishes the process (returns to step S1).

Returning to step S4 in FIG. 3, in a case where the determination in step S4 is YES and the engine water temperature is lower than the reference water temperature TW1, the controller 100 further determines whether or not the outside air temperature is lower than the reference temperature Ta (step S5). In other words, in step S5, the controller 100 determines whether or not each of the outside air temperature and the engine water temperature are in the third region A13.

In a case where the determination in step S5 is NO and the outside air temperature is equal to or higher than the reference temperature, the controller 100 progresses to step S20, does not prohibit the LP-EGR, and carries out the normal EGR control. Further, the controller 100 thereafter progresses to step S21 and carries out the normal torque restriction.

On the other hand, in a case where the determination in step S5 is YES and the outside air temperature is lower than the reference temperature, the controller 100 prohibits the LP-EGR. In other words, the controller 100 closes the LP-EGR valve 73 and prohibits opening of that (step S6). Note that when the LP-EGR valve 73 is already closed, the controller 100 maintains closure of the LP-EGR valve 73.

As described above, the LP-EGR passage 71 is connected to a portion of the exhaust passage 40 on the downstream side relative to the SCR catalyst apparatus 43, and the temperature of the exhaust gas which flows into the LP-EGR passage 71 is comparatively low. Thus, in a case where a flow of the exhaust gas into the LP-EGR passage 71 is permitted when the outside air temperature is low, water contained in the exhaust gas may freeze in the LP-EGR passage 71. In particular, in the present embodiment, the EGR cooler 72 is provided on the LP-EGR passage 71, the exhaust gas is cooled, and freezing in the LP-EGR passage 71 is thereby likely to occur. When freezing occurs in the LP-EGR passage 71, problems may occur such as the LP-EGR valve 73 failing to appropriately open or close. Accordingly, in the present embodiment, in a case where the outside air temperature is low (lower than the reference temperature) and it is estimated that freezing may occur in the LP-EGR passage 71, the LP-EGR is prohibited. In other words, in above step S5, it is determined whether or not freezing may occur in the LP-EGR passage 71, and the above reference temperature is the highest temperature of a temperature at which freezing can occur in the LP-EGR passage 71.

Here, when the engine water temperature is high, the highest outside air temperature at which freezing can occur becomes low due to the temperature of the exhaust gas being high. In response to this, in the present embodiment, as described above, the reference temperature is set such that its value becomes lower as the engine water temperature becomes higher. Specifically, as illustrated in FIG. 6, when the engine water temperature is lower than a predetermined water temperature TW2, the reference temperature is set to have a lower value as the engine water temperature becomes lower; and the reference temperature is set to a fixed value regardless of the engine water temperature when the engine water temperature is equal to or higher than the above-water temperature TW2. Note that the above-water temperature TW2 is a temperature lower than the reference water temperature TW1. The relationship between the engine water temperature and the reference temperature, which is illustrated in FIG. 6, is set in advance by an experiment or the like, and the above relationship is stored as a map in the controller 100. The controller 100 extracts, from the map, the reference temperature which corresponds to the engine water temperature detected by the water temperature sensor SN2 and performs the determination in step S5 by using the extracted reference temperature.

Figure 8:
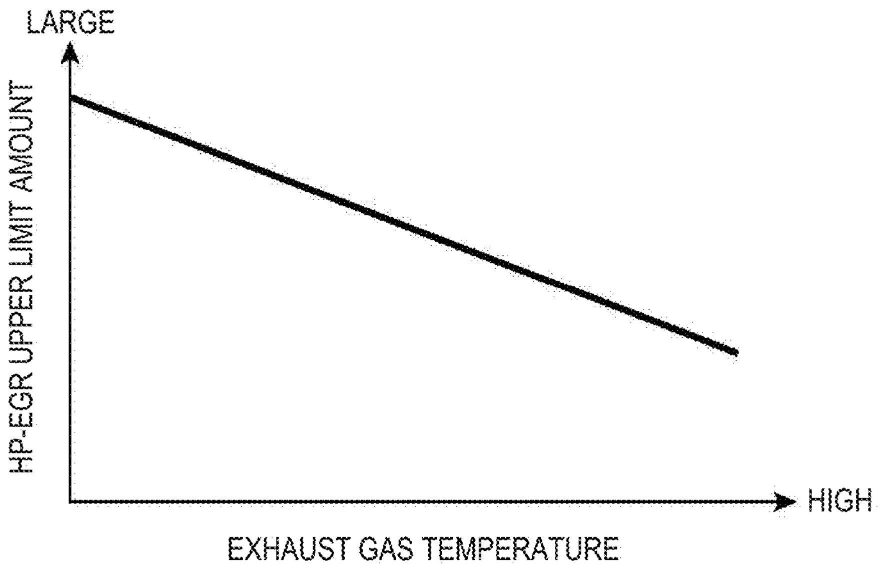
FIG. 8 is a graph illustrating a relationship between an exhaust gas temperature and an HP-EGR upper limit amount.

Next to step S6, the controller 100 calculates an HP-EGR upper limit amount (step S7). The HP-EGR upper limit amount, which is one example of "high-pressure EGR gas upper limit amount" in the present disclosure, is an upper limit amount of an amount of HP-EGR gas as the return amount of the HP-EGR gas. By carrying out step S6, the LP-EGR is prohibited. Accordingly, when step S7 is carried out, the exhaust gas has to be returned only by the HP-EGR apparatus 50. However, the HP-EGR passage 51 is connected to a portion of the exhaust passage 40 on the upstream side relative to the turbine 62, and the temperature of the exhaust gas which flows into the HP-EGR passage 51 is comparatively high. Thus, when a large amount of the exhaust gas is caused to flow through the HP-EGR passage 51, apparatuses around the HP-EGR passage 51 may be subject to heat damage. The above HP-EGR upper limit amount is a minimum value of the amount of HP-EGR gas at which heat damage is preventable. Here, when the temperature of the exhaust gas is high, the above heat damage is likely to occur. In response to this, as illustrated in FIG. 8, the HP-EGR upper limit amount is set to have a lower value as the temperature of the exhaust gas becomes higher. A relationship between the temperature of the exhaust gas and the HP-EGR upper limit amount, which is illustrated in FIG. 8, is set in advance by an experiment or the like, and the above relationship is stored as a map in the controller 100. In step S9, the controller 100 extracts, from the map, a value that corresponds to an exhaust gas temperature which is detected by the exhaust gas temperature sensor SN5 and sets the value as the HP-EGR upper limit amount.

After the HP-EGR upper limit amount is calculated, the controller 100 determines whether or not the target EGR amount calculated in step S1 is larger than the HP-EGR upper limit amount (step S8).

In a case where the determination in step S8 is NO and the target EGR amount is equal to or smaller than the HP-EGR upper limit amount, the controller 100 controls the HP-EGR apparatus 50 such that the target EGR amount is realized (Step S9). In other words, the controller 100 controls the opening of each of the HP-EGR valve 53 and the throttle valve 33 such that the amount of HP-EGR gas becomes the target EGR amount. Further, the controller 100 carries out the normal torque restriction (step S21) and suppresses the engine torque to the normal upper limit torque or smaller. After the normal torque restriction is carried out, the controller 100 finishes the process (returns to step S1).

On the other hand, in a case where the determination in step S8 is YES and the target EGR amount is larger than the HP-EGR upper limit amount, the controller 100 controls the opening of each of the HP-EGR valve 53 and the throttle valve 33 such that the amount of HP-EGR gas becomes the HP-EGR upper limit amount (step S10). In other words, the amount of EGR gas is restricted.

Further, in a case where the determination in step S8 is YES, the controller 100 carries out low-temperature torque restriction (step S11). The low-temperature torque restriction is a control for further restricting the normal engine torque, where the upper limit value of the engine torque is set to low-temperature normal torque which is smaller than the normal upper limit torque, and the engine torque is controlled so as not to exceed the upper limit value (low-temperature normal torque).

Figure 9:
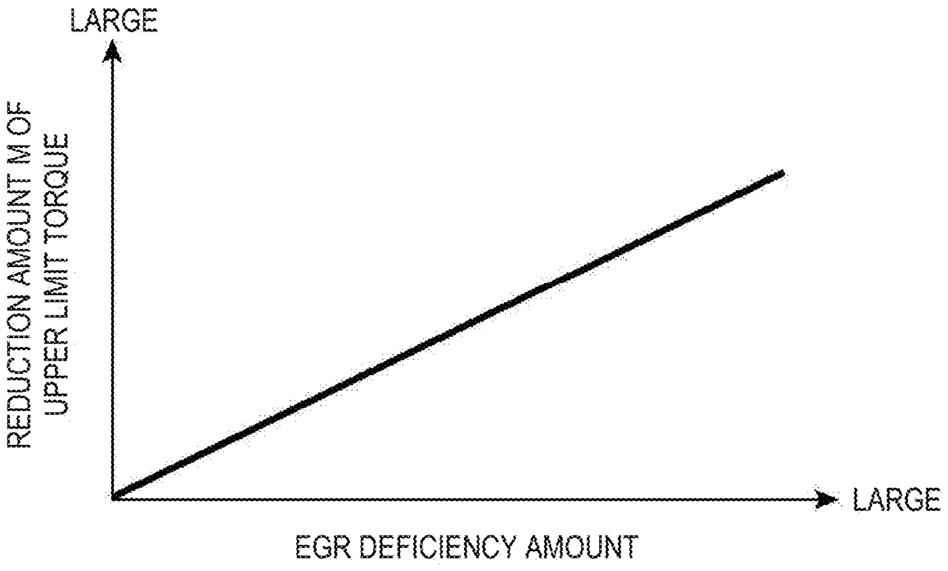
FIG. 9 is a graph illustrating a relationship between an EGR deficiency and a reduction in upper limit torque.

Specifically, the controller 100 first sets the normal upper limit torque similarly to the normal torque restriction. Next, the controller 100 sets a reduction amount M of the upper limit torque. In the present embodiment, as illustrated in FIG. 9, as an EGR deficiency becomes larger, the reduction amount M is set to have a higher value. The EGR deficiency is a deficiency in the HP-EGR upper limit amount with respect to the target EGR amount and is the difference between the target EGR amount and the HP-EGR upper limit amount. Based on the target EGR amount set in step S1 and the HP-EGR upper limit amount calculated in step S7, the controller 100 calculates the EGR deficiency. The controller 100 thereafter sets a value, which is lower than the value of the normal upper limit torque by the reduction amount M, to low-temperature upper limit torque.

Figure 10:
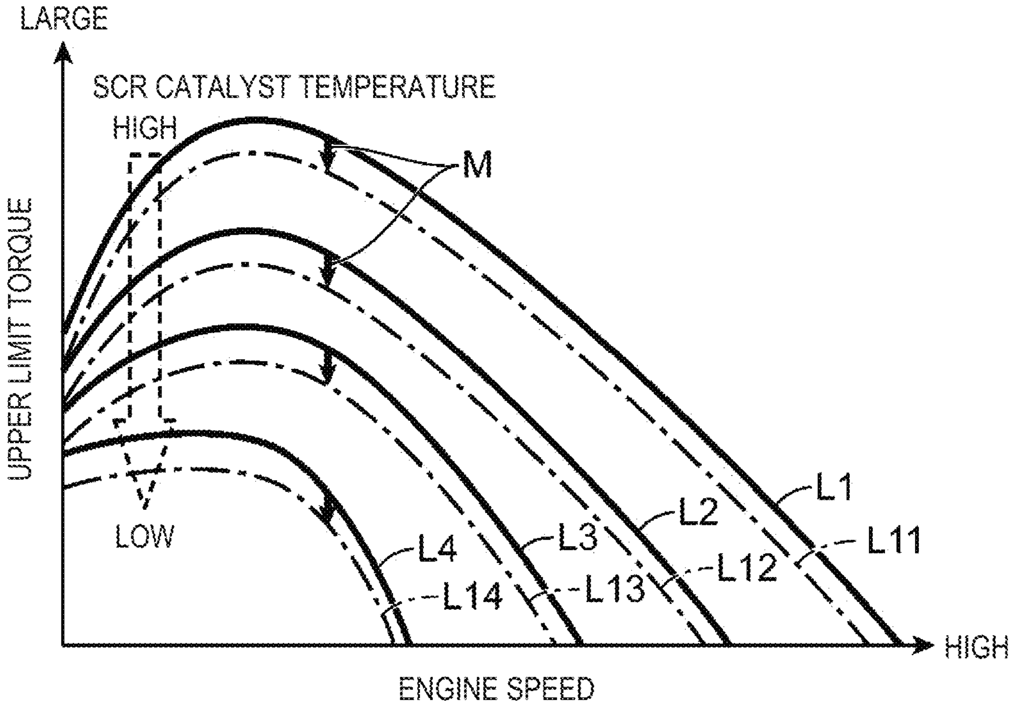
FIG. 10 is a graph illustrating the normal upper limit torque and low-temperature upper limit torque while comparing those.

FIG. 10 is a graph for comparing the normal upper limit torque with the low-temperature upper limit torque. In FIG. 10, solid lines indicate the normal upper limit torque, dot-dash lines indicate the low-temperature upper limit torque. Dot-dash lines L11 to L14 in FIG. 10 indicate the normal upper limit torque which respectively correspond to lines L1 to L4 of the normal upper limit torque. As it can be understood from those dot-dash lines L11 to L14, similarly to the normal upper limit torque, the low-temperature upper limit torque changes in accordance with the SCR catalyst temperature and the engine speed and is set to have a lower value as the SCR catalyst temperature becomes lower. Further, as described above, as the EGR deficiency becomes larger, the reduction amount M is set to have a higher value. Accordingly, the low-temperature upper limit torque is set so as to become smaller as the SCR catalyst temperature becomes lower and to become smaller as the EGR deficiency becomes larger.

After the low-temperature upper limit torque is set, the controller 100 compares the requested torque, which is calculated in step S1, with the low-temperature upper limit torque. Then, in a case where the requested torque is equal to or smaller than the low-temperature upper limit torque, the controller 100 determines the fuel injection amount based on the requested torque and controls the injectors 9 accordingly. On the other hand, in a case where the requested torque is larger than the low-temperature upper limit torque, the controller 100 determines the fuel injection amount based on the low-temperature upper limit torque, which is lower than the maximum value of the engine torque and is lower than the normal upper limit torque, and controls the injectors 9 accordingly. After the low-temperature torque restriction is carried out, the controller 100 finishes the process (returns to step S1).

Note that in both cases where the normal control is carried out and where the torque restriction is carried out, the controller 100 determines an injection amount of the urea water based on the SCR catalyst temperature estimated in step S4 and controls the urea injector 45 accordingly.

As described above, in a case where the SCR catalyst temperature is lower than the reference catalyst temperature (the determination in step S3 is YES), the normal torque restriction or the low-temperature torque restriction is carried out, and the engine torque is restricted. Further, in a case where the SCR catalyst temperature is lower than the reference catalyst temperature, when the engine water temperature is equal to or higher than the reference water temperature (the determination in step S4 is NO) or the outside air temperature is equal to or higher than the reference temperature (the determination in step S5 is NO), the normal torque restriction is carried out. Further, in a case where the SCR catalyst temperature is lower than the reference catalyst temperature (a case where the determination in step S3 is YES), when the engine water temperature is lower than the reference water temperature (the determination in step S4 is YES) and the outside air temperature is lower than the reference temperature (the determination in step S5 is YES) but the target EGR amount is smaller than the HP-EGR upper limit amount, the normal torque restriction is also carried out. On the other hand, in a case where the SCR catalyst temperature is lower than the reference catalyst temperature (a case where the determination in step S3 is YES), when the engine water temperature is lower than the reference water temperature (the determination in step S4 is YES), the outside air temperature is lower than the reference temperature (the determination in step S5 is YES), and the target EGR amount is equal to or greater than the HP-EGR upper limit amount, the low-temperature torque restriction is carried out, and stronger restriction than the normal torque restriction is applied to the engine torque. Note that a control in which the normal torque restriction and the low-temperature torque restriction are integrated and in which the engine torque is restricted is one example of "restriction control" of the present disclosure.

System Operation

As described in the foregoing, in the engine system 1 according to the present embodiment, in a case where the SCR catalyst temperature is lower than the reference catalyst temperature, the normal torque restriction or the low-temperature torque restriction is carried out, and the injectors 9 are controlled such that the engine torque is equal to or smaller than the normal upper limit torque or the low-temperature upper limit torque, while having a smaller value than the maximum value of the engine torque. Thus, when a purification capability of the SCR catalyst is low because the SCR catalyst temperature is lower than the reference catalyst temperature, a large amount of combustion gas and thus the exhaust gas can be prevented from being generated. In other words, this prevents a situation where $NO_x$ is discharged from the engine body 2 without being completely purified. Consequently, a $NO_x$ discharge amount can be suppressed to a small amount, and proper exhaust performance can be achieved.

Further, when the outside air temperature is lower than the reference temperature, the LP-EGR apparatus 70 is prohibited. Thus, as described above, a situation can be prevented where water in the exhaust gas freezes in the LP-EGR passage 71 due to a low outside air temperature, and problems such as the LP-EGR valve 73 failing to appropriately open or close.

Further, in a case where the outside air temperature is lower than the reference temperature, the LP-EGR apparatus 70 is prohibited as described above, but the HP-EGR is permitted. Thus, the exhaust gas, in other words, inactive gas, can enter the intake passage 30 and the cylinders 2*a*, while freezing in the LP-EGR passage 71 is prevented, and $NO_x$ generated in the cylinders 2*a* and discharged from the engine body 2 can thereby be suppressed to small amounts.

However, as described above, when a large amount of the exhaust gas flows through the HP-EGR passage 51, the apparatuses around the HP-EGR passage 51 may be subject to heat damage. However, in the present embodiment, a configuration is made such that in a case where the outside air temperature is lower than the reference temperature, the amount of HP-EGR gas is suppressed to the HP-EGR upper limit amount or smaller, and the high-temperature HP-EGR gas does not excessively flow through the HP-EGR passage 51. Thus, the above heat damage can be prevented while generation and discharge of $NO_x$ is suppressed by the HP-EGR. In particular, the HP-EGR upper limit amount is set to have a lower value as the temperature of the exhaust gas becomes higher, and thus heat damage can be prevented and generation and discharge of $NO_x$ can effectively be suppressed.

Furthermore, in a case where the torque restriction is performed because the SCR catalyst temperature is lower than the reference catalyst temperature: when a condition is met that the outside air temperature is lower than the reference temperature and the target EGR amount is equal to or greater than the HP-EGR upper limit amount (that is, when the LP-EGR cannot be performed to prevent freezing in a state where the purification capability of the SCR catalyst is low and sufficient exhaust gas cannot be returned by the HP-EGR apparatus 50 to prevent heat damage), the upper limit value of the engine torque is set to a lower value (low-temperature upper limit torque) than when the above condition is not met (normal upper limit torque). Thus, a deficiency in returning exhaust gas can be compensated by reduction in an amount of combustion gas, and increases in generation and discharge of $NO_x$ can be suppressed. As noted above, in the present embodiment, proper exhaust performance can be achieved while preventing freezing in the LP-EGR passage 71 and thus ensuring appropriate work of the LP-EGR apparatus 70, and while preventing heat damage to peripheral components of the HP-EGR apparatus 50 and thus ensuring appropriate work of the HP-EGR apparatus 50.

Further, in the present embodiment, the low-temperature upper limit torque is set to become smaller as the SCR catalyst temperature becomes lower, and to become smaller as the EGR deficiency becomes larger. Thus, the low-temperature upper limit torque can be set to an appropriate value which corresponds to a $NO_x$ purification capability of the SCR catalyst and the deficiency of the EGR gas. Consequently, proper exhaust performance can be achieved without excessively decreasing the engine torque.

Modifications

In the above embodiment, a description is made about a case where the engine torque is changed by changing the amount of fuel to be injected from the injectors 9, but an apparatus for changing the engine torque is not limited to the injector 9. For example, the intake air flow amount is changed by changing the opening of the throttle valve 33, and the engine torque may thereby be changed. However, the engine according to the present embodiment is a diesel engine, and the engine torque is changed mainly in accordance with the fuel injection amount.

In the above embodiment, a description is made about a case where the upper limit value is set for the engine torque and the injectors 9 are controlled such that the engine torque has a value equal to or lower than the upper limit value, but an upper limit value is set for an engine output instead of the engine torque, and the injectors 9 and so forth may thereby be controlled such that the engine output has a value equal to or lower than the upper limit value.

In the above embodiment, the determination in step S4, in other words, the determination of whether or not the engine water temperature is lower than the reference water temperature, may be omitted. Further, steps S7, S8, S9, and S10 may be omitted. In other words, in a case where the determination in step S5 is YES and the outside air temperature is lower than the reference temperature, the low-temperature torque restriction may be carried out regardless of the target EGR amount. Further, the HP-EGR apparatus 50 itself may be omitted.

Further, in the above embodiment, step S6, that is, the control for prohibiting the LP-EGR, may be omitted. In other words, a configuration may be made such that the LP-EGR is permitted even when the outside air temperature is lower than the reference temperature. Note that in this case, although freezing may occur in the LP-EGR passage 71, proper exhaust performance can be achieved by carrying out torque restriction similar to that in the above embodiment. Specifically, in a case where the LP-EGR is permitted, when the outside air temperature is lower than the reference temperature, freezing may occur in the LP-EGR passage 71 and thus the exhaust gas cannot sufficiently be returned through the LP-EGR passage 71, and generation and discharge of $NO_x$ may increase. However, when the above torque restriction is carried out and engine torque restriction is thereby strengthened in a case where the outside air temperature is lower than the reference temperature, generation and discharge of $NO_x$ can certainly be decreased, and proper exhaust performance can be achieved.

Further, in the above embodiment, a description is made about a case where the SCR catalyst temperature is acquired by estimation, but the SCR catalyst temperature may be acquired by detection by a sensor. Similarly, the outside air temperature may be acquired by estimation instead of detection by the outside air temperature sensor SN7.

Further, a specific apparatus for purifying the exhaust gas is not limited to the above. Further, the engine is not limited to a diesel engine and may be a gasoline engine. Further, a specific structure of the apparatus, which is provided in the exhaust passage 40 and purifies the exhaust gas, is not limited to the above.

An engine control method for use with an engine system as described above will now be described. As discussed above the engine system can include an engine body with an intake passage through which intake air entering the engine body flows, an exhaust passage through which exhaust gas exiting the engine body flows, an adjustment apparatus which adjusts an engine output parameter, an exhaust gas purification apparatus that is disposed in the exhaust passage and purifies exhaust gas, an exhaust gas recirculation (EGR) passage that connects the exhaust passage on a downstream side relative to the exhaust gas purification apparatus with the intake passage and returns EGR gas as part of exhaust gas to the intake passage, an EGR valve that opens and closes the EGR passage, an outside air temperature acquisition apparatus that acquires an outside air temperature, a purification apparatus temperature acquisition apparatus that acquires a purification apparatus temperature as a temperature of the exhaust gas purification apparatus, and a control apparatus that controls the adjustment apparatus and the EGR valve.

In one aspect, the method comprises carrying out, via the control apparatus, restriction control to control the adjustment apparatus to adjust an engine output parameter of an engine such that an upper limit value of the engine output parameter is set lower than a maximum value and the engine output parameter has a value equal to or lower than the upper limit value, in a case where a purification apparatus temperature is lower than a predetermined reference temperature. The method further includes setting the upper limit value to a first upper limit value when the outside air temperature acquired by the outside air temperature acquisition apparatus is at a first temperature and a second upper limit value when the outside air temperature is at a second temperature that is higher than the first temperature, the first upper limit value being lower than the second upper limit value.

In this aspect, the method can further comprise prohibiting opening of the EGR valve when the outside air temperature is lower than a predetermined reference temperature.

In this aspect, the engine system can further includes a high-pressure EGR passage which connects the exhaust passage on an upstream side relative to the exhaust gas purification apparatus with the intake passage; and a high-pressure EGR valve which opens and closes the high-pressure EGR passage, and the method can further comprise: when the restriction control is carried out: setting the upper limit value to a lower value than when the outside air temperature is equal to or higher than the reference temperature, when the outside air temperature is lower than the reference temperature, permitting opening of the EGR valve and the high-pressure EGR valve when the outside air temperature is equal to or higher than the reference temperature, and permitting opening of the high-pressure EGR valve but prohibiting opening of the EGR valve when the outside air temperature is lower than the reference temperature.

In this aspect, the method can further comprise: setting a target EGR amount as a target value of an amount of exhaust gas to be returned to the intake passage; setting a high-pressure EGR gas upper limit amount as an upper limit value of a high-pressure EGR gas amount to be returned to the intake passage via the high-pressure EGR passage, controlling the high-pressure EGR valve such that the high-pressure EGR gas amount has a value equal to or lower than the upper limit value; and in carrying out the restriction control, setting the upper limit value to the same value as when the outside air temperature is equal to or higher than the reference temperature, when the outside air temperature is lower than the reference temperature and the target EGR amount is equal to or smaller than the high-pressure EGR gas upper limit amount; and setting the upper limit value to a lower value than when the outside air temperature is equal to or higher than the reference temperature, when the outside air temperature is lower than the reference temperature and the target EGR amount is greater than the high-pressure EGR gas upper limit amount.

In this aspect, the engine system can further include an exhaust gas temperature detection apparatus which detects a temperature of exhaust gas, and the method can further comprise: setting the high-pressure EGR gas upper limit amount to have a lower value as the temperature of the exhaust gas, which is detected by the exhaust gas temperature detection apparatus, becomes higher.

In this aspect, the method can further comprise: setting the upper limit value such that the upper limit value becomes lower as the purification apparatus temperature becomes lower when the outside air temperature is lower than the reference temperature and the target EGR amount is greater than the high-pressure EGR gas upper limit amount, such that the upper limit value becomes lower as a deficiency in the high-pressure EGR gas upper limit amount with respect to the target EGR amount becomes greater.

In this aspect, the engine output parameter can be engine torque or engine crankshaft rotation speed.

In this aspect, the adjustment apparatus can include a fuel injector, a throttle valve, intake valve operating mechanism, and/or exhaust valve operating mechanism.

According to another aspect of the disclosure, an engine system for a hybrid vehicle is provided, comprising: an internal combustion engine body configured to produce engine output that charges a battery for a motor that propels the hybrid vehicle; an intake passage through which intake air entering the engine body flows; an exhaust passage through which exhaust gas exiting the engine body flows; an adjustment apparatus which adjusts an engine output parameter, the adjustment apparatus including a fuel injector, a throttle valve, intake valve operating mechanism, and/or exhaust valve operating mechanism and the engine output parameter including engine torque and/or engine crankshaft rotation speed; an exhaust gas purification apparatus which is disposed in the exhaust passage and purifies exhaust gas; an exhaust gas recirculation (EGR) passage which connects the exhaust passage on a downstream side relative to the exhaust gas purification apparatus with the intake passage and returns EGR gas as part of exhaust gas to the intake passage; an EGR valve which opens and closes the EGR passage; an outside air temperature acquisition apparatus which acquires an outside air temperature; a purification apparatus temperature acquisition apparatus which acquires a purification apparatus temperature as a temperature of the exhaust gas purification apparatus; and a control apparatus which controls the adjustment apparatus and the EGR valve. The control apparatus carries out restriction control to control the adjustment apparatus such that an upper limit value of the engine output parameter is set lower than a maximum value and the engine output parameter has a value equal to or lower than the upper limit value in a case where the purification apparatus temperature is lower than a predetermined reference temperature, and sets the upper limit value to a first upper limit value when the outside air temperature acquired by the outside air temperature acquisition apparatus is at a first temperature and a second upper limit value when the outside air temperature is at a second temperature that is higher than the first temperature, the first upper limit value being lower than the second upper limit value, wherein the control apparatus prohibits opening of the EGR valve when the outside air temperature is lower than a predetermined reference temperature.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

Reference Character List

2 engine body
9 fuel injector (adjustment apparatus)
30 intake passage
40 exhaust passage
42 SCRF (exhaust gas purification apparatus)
43 SCR catalyst apparatus (exhaust gas purification apparatus)
51 HP-EGR passage (high-pressure EGR passage)
53 HP-EGR valve (high-pressure EGR valve)
71 LP-EGR passage (EGR passage)
73 LP-EGR valve (EGR valve)
100 controller (control apparatus, purification apparatus temperature acquisition unit)
SN5 exhaust gas temperature sensor (exhaust gas temperature detection apparatus)
SN7 outside air temperature sensor (outside air temperature acquisition apparatus)

The invention claimed is:

1. An engine system comprising:

an engine body;

an intake passage through which intake air entering the engine body flows;

an exhaust passage through which exhaust gas exiting the engine body flows;

an adjustment apparatus which adjusts an engine output parameter, wherein the adjustment apparatus includes a fuel injector, a throttle valve, an intake valve operating mechanism, and/or exhaust valve operating mechanism;

a catalytic exhaust gas purification apparatus which is disposed in the exhaust passage and purifies exhaust gas;

an exhaust gas recirculation (EGR) passage which connects the exhaust passage on a downstream side relative to the catalytic exhaust gas purification apparatus with the intake passage and returns EGR gas as part of exhaust gas to the intake passage;

an EGR valve which opens and closes the EGR passage;

an outside air temperature acquisition apparatus which acquires an outside air temperature; and a controller which controls the adjustment apparatus and the EGR valve, wherein the controller:

acquires a purification apparatus temperature as a temperature of the catalytic exhaust gas purification apparatus;

carries out restriction control to control the adjustment apparatus such that an upper limit value of the engine output parameter is set lower than a maximum value and the engine output parameter has a value equal to or lower than the upper limit value in a case where the purification apparatus temperature is lower than a predetermined reference temperature, sets the upper limit value to a first upper limit value when the outside air temperature acquired by the outside air temperature acquisition apparatus is at a first temperature and a second upper limit value when the outside air temperature is at a second temperature that is higher than the first temperature, the first upper limit value being lower than the second upper limit value, and prohibits opening of the EGR valve when the outside air temperature is lower than a predetermined reference temperature.

2. The engine system according to claim 1, further comprising:

a high-pressure EGR passage which connects the exhaust passage on an upstream side relative to the catalytic exhaust gas purification apparatus with the intake passage; and a high-pressure EGR valve which opens and closes the high-pressure EGR passage, wherein when the restriction control is carried out, the controller:

sets the upper limit value to a lower value than when the outside air temperature is equal to or higher than the reference temperature, when the outside air temperature is lower than the reference temperature, permits opening of the EGR valve and the high-pressure EGR valve when the outside air temperature is equal to or higher than the reference temperature, and permits opening of the high-pressure EGR valve but prohibits opening of the EGR valve when the outside air temperature is lower than the reference temperature.

3. The engine system according to claim 2, wherein the controller:

sets a target EGR amount as a target value of an amount of exhaust gas to be returned to the intake passage;

sets a high-pressure EGR gas upper limit amount as an upper limit value of a high-pressure EGR gas amount to be returned to the intake passage via the high-pressure EGR passage, controls the high-pressure EGR valve such that the high-pressure EGR gas amount has a value equal to or lower than the upper limit value; and in carrying out the restriction control, sets the upper limit value to the same value as when the outside air temperature is equal to or higher than the reference temperature, when the outside air temperature is lower than the reference temperature and the target EGR amount is equal to or smaller than the high-pressure EGR gas upper limit amount;

and sets the upper limit value to a lower value than when the outside air temperature is equal to or higher than the reference temperature, when the outside air temperature is lower than the reference temperature and the target EGR amount is greater than the high-pressure EGR gas upper limit amount.

4. The engine system according to claim 3, further comprising:

an exhaust gas temperature sensor which detects a temperature of exhaust gas, wherein the controller sets the high-pressure EGR gas upper limit amount to have a lower value as the temperature of the exhaust gas, which is detected by the exhaust gas temperature sensor, becomes higher.

5. The engine system according to claim 3, wherein the controller:

sets the upper limit value such that the upper limit value becomes lower as the purification apparatus temperature becomes lower when the outside air temperature is lower than the reference temperature and the target EGR amount is greater than the high-pressure EGR gas upper limit amount, such that the upper limit value becomes lower as a deficiency in the high-pressure EGR gas upper limit amount with respect to the target EGR amount becomes greater.

6. The engine system according to claim 1, wherein the engine output parameter is an engine crankshaft rotation speed or engine torque.

7. An engine control method for use with an engine system including an engine body including an intake passage through which intake air entering the engine body flows, an exhaust passage through which exhaust gas exiting the engine body flows, an adjustment apparatus which adjusts an engine output parameter, a catalytic exhaust gas purification apparatus that is disposed in the exhaust passage and purifies exhaust gas, an exhaust gas recirculation (EGR) passage that connects the exhaust passage on a downstream side relative to the catalytic exhaust gas purification apparatus with the intake passage and returns EGR gas as part of exhaust gas to the intake passage, an EGR valve that opens and closes the EGR passage, an outside air temperature acquisition apparatus that acquires an outside air temperature, controller that controls the adjustment apparatus and the EGR valve, the method comprising:

acquiring a purification apparatus temperature as a temperature of the catalytic exhaust gas purification apparatus, carrying out, via the controller, restriction control to control the adjustment apparatus that adjust an engine output parameter of an engine such that an upper limit value of the engine output parameter is set lower than a maximum value and the engine output parameter has a value equal to or lower than the upper limit value in a case where a purification apparatus temperature is lower than a predetermined reference temperature, wherein the adjustment apparatus includes a fuel injector, a throttle valve, an intake valve operating mechanism, and/or exhaust valve operating mechanism, setting the upper limit value to a first upper limit value when the outside air temperature acquired by the outside air temperature acquisition apparatus is at a first temperature and a second upper limit value when the outside air temperature is at a second temperature that is higher than the first temperature, the first upper limit value being lower than the second upper limit value, and prohibiting opening of the EGR valve when the outside air temperature is lower than a predetermined reference temperature.

8. The engine control method according to claim 7, wherein the engine system further includes a high-pressure EGR passage which connects the exhaust passage on an upstream side relative to the catalytic exhaust gas purification apparatus with the intake passage; and a high-pressure EGR valve which opens and closes the high-pressure EGR passage, the method further comprising:

when the restriction control is carried out:

setting the upper limit value to a lower value than when the outside air temperature is equal to or higher than the reference temperature, when the outside air temperature is lower than the reference temperature, permitting opening of the EGR valve and the high-pressure EGR valve when the outside air temperature is equal to or higher than the reference temperature, and permitting opening of the high-pressure EGR valve but prohibiting opening of the EGR valve when the outside air temperature is lower than the reference temperature.

9. The engine control method according to claim 8, further comprising:

setting a target EGR amount as a target value of an amount of exhaust gas to be returned to the intake passage;

setting a high-pressure EGR gas upper limit amount as an upper limit value of a high-pressure EGR gas amount to be returned to the intake passage via the high-pressure EGR passage, controlling the high-pressure EGR valve such that the high-pressure EGR gas amount has a value equal to or lower than the upper limit value; and in carrying out the restriction control, setting the upper limit value to the same value as when the outside air temperature is equal to or higher than the reference temperature, when the outside air temperature is lower than the reference temperature and the target EGR amount is equal to or smaller than the high-pressure EGR gas upper limit amount; and setting the upper limit value to a lower value than when the outside air temperature is equal to or higher than the reference temperature, when the outside air temperature is lower than the reference temperature and the target EGR amount is greater than the high-pressure EGR gas upper limit amount.

10. The engine control method according to claim 9, wherein the engine system further includes an exhaust gas temperature sensor which detects a temperature of exhaust gas, the method further comprising:

setting the high-pressure EGR gas upper limit amount to have a lower value as the temperature of the exhaust gas, which is detected by the exhaust gas temperature sensor, becomes higher.

11. The engine control method according to claim 9, further comprising:

setting the upper limit value such that the upper limit value becomes lower as the purification apparatus temperature becomes lower when the outside air temperature is lower than the reference temperature and the target EGR amount is greater than the high-pressure EGR gas upper limit amount, such that the upper limit value becomes lower as a deficiency in the high-pressure EGR gas upper limit amount with respect to the target EGR amount becomes greater.

12. The engine control method according to claim 7, wherein the engine output parameter is an engine crankshaft rotation speed or engine torque.

13. An engine system for a hybrid vehicle, the engine system comprising:

an internal combustion engine body configured to produce engine output that charges a battery for a motor that propels the hybrid vehicle;

an intake passage through which intake air entering the engine body flows;

an exhaust passage through which exhaust gas exiting the engine body flows;

an adjustment apparatus which adjusts an engine output parameter, the adjustment apparatus including a fuel injector, a throttle valve, intake valve operating mechanism, and/or exhaust valve operating mechanism and the engine output parameter including engine torque and/or engine crankshaft rotation speed;

a catalytic exhaust gas purification apparatus which is disposed in the exhaust passage and purifies exhaust gas;

an exhaust gas recirculation (EGR) passage which connects the exhaust passage on a downstream side relative to the catalytic exhaust gas purification apparatus with the intake passage and returns EGR gas as part of exhaust gas to the intake passage;

an EGR valve which opens and closes the EGR passage;

an outside air temperature acquisition apparatus which acquires an outside air temperature; and a controller which controls the adjustment apparatus and the EGR valve, wherein the controller:

acquires a purification apparatus temperature as a temperature of the catalytic exhaust gas purification apparatus;

carries out restriction control to control the adjustment apparatus such that an upper limit value of the engine output parameter is set lower than a maximum value and the engine output parameter has a value equal to or lower than the upper limit value in a case where the purification apparatus temperature is lower than a predetermined reference temperature, and sets the upper limit value to a first upper limit value when the outside air temperature acquired by the outside air temperature acquisition apparatus is at a first temperature and a second upper limit value when the outside air temperature is at a second temperature that is higher than the first temperature, the first upper limit value being lower than the second upper limit value, wherein the controller prohibits opening of the EGR valve when the outside air temperature is lower than a predetermined reference temperature.

* * * * *